Jan. 5, 1965     W. H. FRANCISCO, JR     3,164,025
TOROIDAL DRIVE HYDRAULIC STOP

Filed March 20, 1963                       3 Sheets-Sheet 1

INVENTOR.
WILLIAM H. FRANCISCO, JR.
BY
ATTORNEY

INVENTOR.
WILLIAM H. FRANCISCO, JR.
BY
ATTORNEY

Jan. 5, 1965     W. H. FRANCISCO, JR     3,164,025
TOROIDAL DRIVE HYDRAULIC STOP
Filed March 20, 1963     3 Sheets-Sheet 3
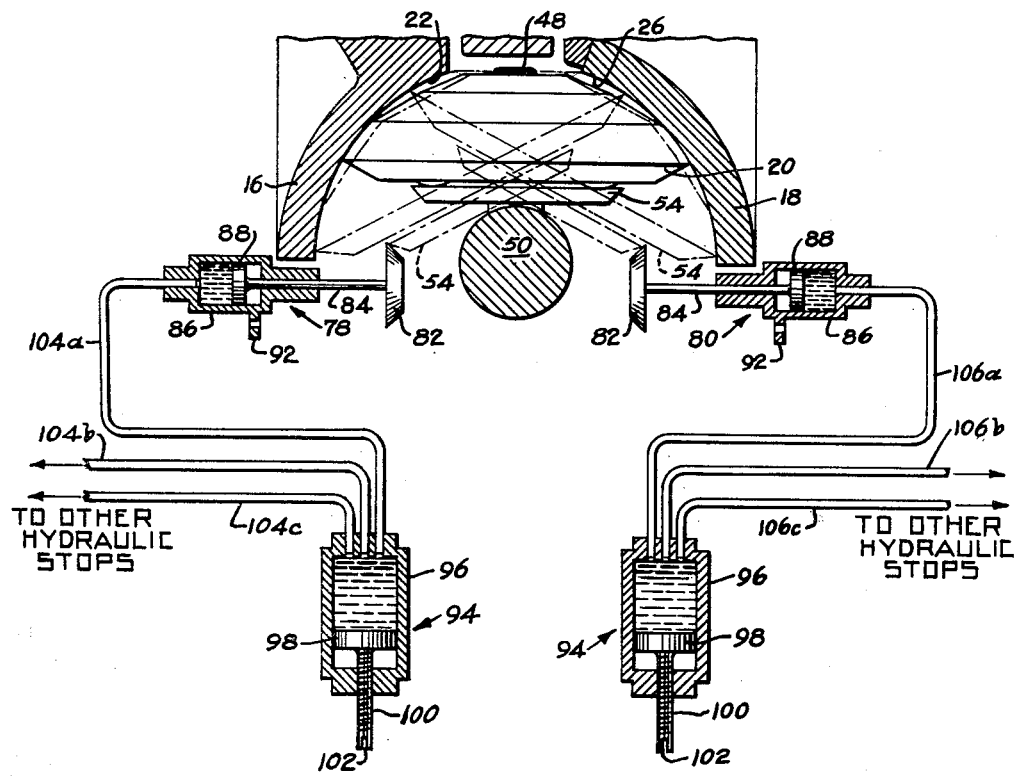
INVENTOR
WILLIAM H. FRANCISCO, JR.
BY
ATTORNEY

3,164,025
TOROIDAL DRIVE HYDRAULIC STOP
William H. Francisco, Jr., Morris Plains, N.J., assignor to Curtiss-Wright Corporation, a corporation of Delaware
Filed Mar. 20, 1963, Ser. No. 266,550
5 Claims. (Cl. 74—200)

This invention relates to variable speed transmissions of the toroidal type and is particularly related to an adjustable stop mechanism for limiting the speed-ratio changing movement of the rollers in a transmission of this type.

Transmissions of this type generally comprise a pair of co-axial input and output drive members having facing toroidal or toric surfaces with a plurality of rollers (preferably three) disposed between and in friction contact with said surfaces and with each roller mounted for speed-ratio changing movement to change the speed-ratio of the driving connection provided by the rollers between and the toroidal members. The traction forces on each roller are balanced against a controllable fluid force such that any unbalance between said control force and traction drive forces causes the roller to move in a manner inducing speed-ratio changing movement of the roller to a position in which the forces on said roller are again in balance. A transmission of this type is disclosed in United States Patent 3,008,337, issued on November 14, 1961.

In previous transmissions of this type the stops used for limiting the speed-ratio position of the rollers each had to be individually adjusted which required very accurate and tedious adjustment so that each stop would be equally positioned with respect to its associated roller speed-ratio movement. If the stops are not equally positioned, one roller may be stopped prior to the others and skidding of the rollers may occur and also the contact pressure between the prior stopped roller and its stop might become excessive and damage said roller. The present invention overcomes the problems of prior stop mechanisms, as will be more fully explained hereinafter.

The present invention generally comprises the provision of a plurality of adjustable, hydraulically interconnected stops positioned adjacent each roller so that the rollers will not run off the surfaces of the input and output members during speed-ratio changing movement and further so that the limiting speed-ratio may be varied by adjusting the position of the stops with respect to their associated rollers.

Each stop position adjacent one speed-ratio limiting position can be varied by a hydraulic fluid force which is common to each of the other stops for the corresponding limiting positions of the other rollers. The positions of said stops may be varied by an adjustment piston which pushes the hydraulic fluid against a piston on each of said stop mechanisms and therefore each of said stops will be correspondingly adjusted to a new speed-ratio limiting position. Thus, each of the rollers will be stopped substantially at the same time as they reach a predetermined speed-ratio limiting position. Furthermore, there is no problem of unequal stop position which may cause undesirable effects on the transmission and all of the stops of the present invention may be quickly and accurately set by a single adjustment.

Accordingly it is one object of the invention to provide a novel stop mechanism for a variable speed toroidal-type transmission.

It is another object of the invention to provide a novel adjustable stop mechanism for a variable speed toroidal-type transmission which is simple in construction and which provides for rapid and accurate stop adjustment.

A further object of the invention is to provide a novel adjustable stop mechanism for a variable speed toroidal-type transmission wherein said stop members of said stop mechanism will be balanced by an equal force for equally positioning each of said stop members at a particular speed-ratio limiting position.

Other objects and advantages of the invention will become apparent upon reading the annexed detailed description along with the accompanying drawing in which:

FIG. 3 shows one of the rollers with its associated stop mechanism and hydraulic control means; and FIG. 4 shows a partial sectional view illustrating another embodiment of the invention.

Figure 1:
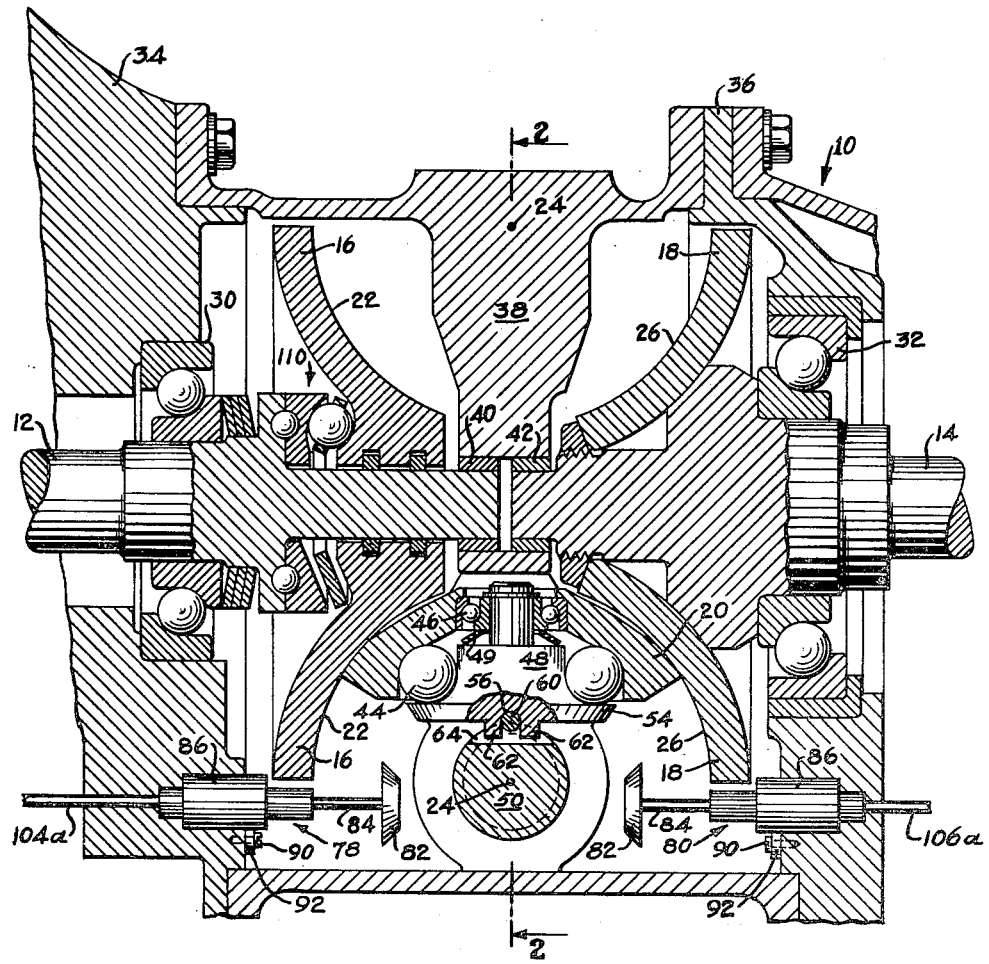
FIG. 1 is an axial sectional view through the transmission embodying the invention with some parts shown in elevation.
Figure 2:
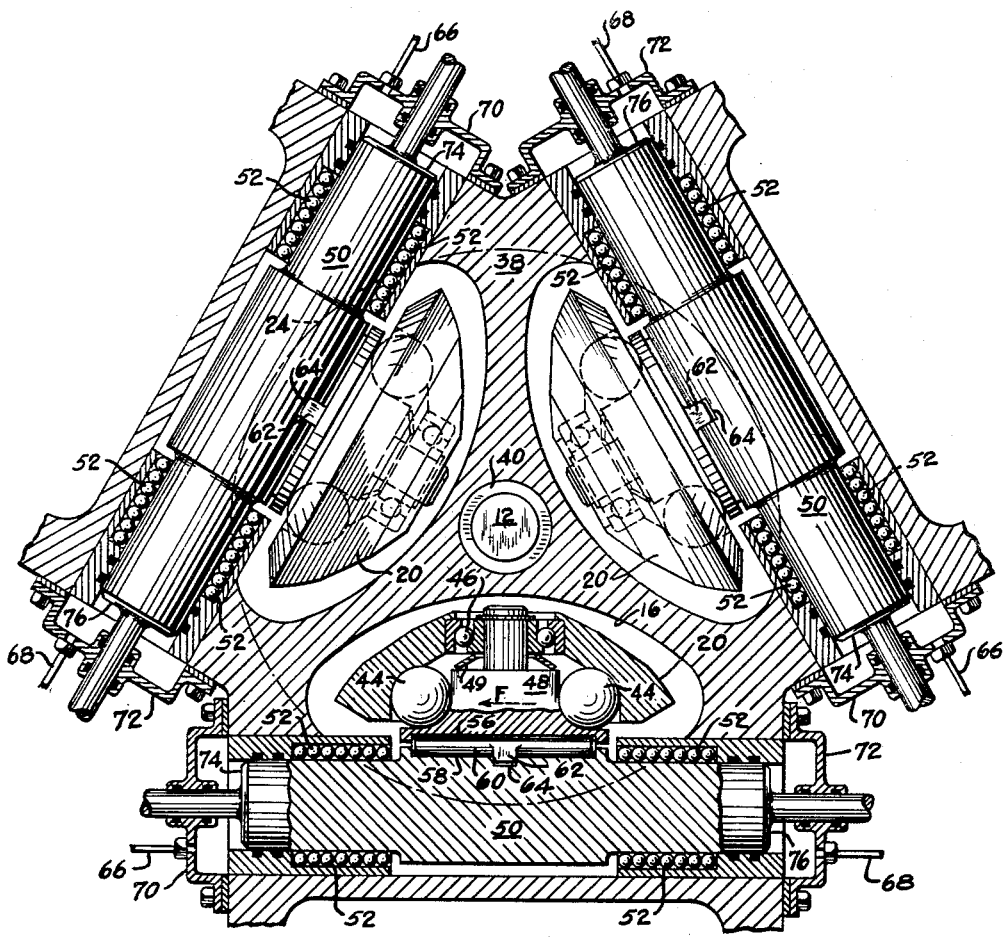
FIG. 2 is a sectional view taken along line 2—2 of FIG. 1, also showing some parts in elevation.

Referring first to FIGS. 1 and 2 of the drawings; a transmission 10 is illustrated as comprising co-axial input and output shafts 12 and 14, input and output toroidal disc members 16 and 18 co-axially mounted on and drivably connected to the shafts 12 and 14 respectively, and a plurality of circumferentially-spaced rollers 20 disposed between and in driving engagement with the toric surfaces of the disc members 16 and 18. Preferably, as illustrated, three rollers 20 are provided between the toroidal members 16 and 18. Also at least one of the toroidal disc members 16 and 18 is axially movable toward the other. For this purpose the disc member 16 is supported on the input shaft 12 for axial movement therealong.

The input toroidial disc member 16 has a toroidal surface 22 which preferably is generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and having substantially the same toric center circle 24.

The shafts 12 and 14 are supported by bearings 30 and 32 in a multi-part housing including end sections 34 and 36 and an intermediate section 38 secured to said end sections. The intermediate housing section 38 is a Y-shaped frame structure between which the three rollers 20 are disposed, said Y-shaped structure providing end bearings 40 and 42 for the adjacent ends of the shafts 12 and 14.

Each roller 20 is journaled by bearings 44 and 46 on a spindle 48, said bearings being designed to support its roller against radial loads and to support its roller 20 against thrust radially outward along its spindle 48, the axis of each said spindle 48 being substantially radial relative to the transmission axis. A spring 49, preferably in the form of a Belleville washer, is disposed between the inner race of the bearing 46 and a shoulder on the spindle 48 so that the axial thrust on the roller 20 serves through its bearing 46 to compress the spring 49 thereby to distribute the axial thrust between the bearings 44 and 46. Since the Belleville spring 49 is between the bearing 46 and the spindle 48 it serves to limit the thrust load carried by said bearing 46, said bearing 46 having a substantially smaller load carrying capacity than the bearing 44.

Each roller spindle 48 is supported by a pivot shaft 50 for speed-ratio changing movement of its roller about the axis of its said pivot shaft and relative to the toric surfaces 22 and 26. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus, the pivot shafts 50, like the roller 20, are circumferentially spaced about the transmission axis, there being one pivot shaft 50 for each roller.

Each pivot shaft 50 is journaled in bearings 52 carried by the intermediate housing section 38. Each roller spindle 48 has an end plate 54 having a substantially semi-cylindrical groove 56 facing a corresponding groove 58 in the surface of an enlarged central portion of its associated pivot shaft 50. Each such semi-cylindrical groove 56 and 58 is disposed parallel to the axis of its associated pivot shaft 50. A pin 60 is received in each facing pair of grooves 56 and 58 so that through its pin 60 the associated roller 20 is supported by the shaft 50 for speed-ratio changing movement of the roller with and about the axis of its shaft 50.

Each pin 60 also permits a limited pivotal movement of its associated roller 20 about the axis of said pin to equalize the contact pressures of said roller against the toric surfaces 22 and 26.

Each pivot shaft 50 has a limited movement along its axis and its associated roller spindle end plate 54 has tongues or lugs 62 received within a cross-slot or groove 64 in the shaft 50 so that movement of a shaft 50 along its axis results in a corresponding movement of its roller 20 in this direction. Obviously, since the cross-slot 64 on each pivot shaft 50 is disposed at right angles to the adjacent pin 60, this engagement between each pivot shaft cross-slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

The direction of rotation of the transmission is such that as viewed in FIG. 2 the input toric member 16 rotates clockwise and therefore the traction forces F exerted by the toric members 16 and 18 on, for example, the lower roller 20 are directed toward the left. Any unbalance of the traction forces on a roller and the forces along and on its pivot shaft 50 results in movement of the roller and its pivot shaft 50 along the axis of said shaft. As fully explained in the aforementioned patent, such movement of a roller 20 along the axis of its pivot shaft 50 results in speed-ratio changing pivotal movement of the roller with and about the axis of its pivot shaft 50 to a speed-ratio position in which said forces are again in balance.

As is known, speed-ratio changing precession of the rollers may also be produced by tilting of each roller about an axis through or parallel to a line through the points of contact of the roller with the toric members 16 and 18. As is also disclosed in said patent, if such a roller tilt axis is offset from a line through the roller points of contact with the toric members, then the traction forces exerted by the toric members 16 and 18 on each roller apply a turning moment on the roller about its tilt axis which may be balanced by the hydraulic control forces. Accordingly, it is within the scope of this invention to use such roller tilting to induce speed-ratio changing movement of the rollers instead of shifting of each roller along the axis of its pivot shaft 50.

As stated above speed-ratio changing movement of the roller 20 may be induced by translation of the pivot shafts 50 along their axes. For this purpose a hydraulic control pressure from a suitable source of hydraulic fluid pressure (not shown) may be applied to both ends of the pivot shafts 50 through conduits 66 and 68 which terminate at cylinders 70 and 72, respectively, supported at each end of the pivot shafts 50. The end faces 74 and 76, respectively, of each pivot shaft 50 serve as piston faces upon which the force of the hydraulic pressure may act to induce translational movement of said pivot shafts 50, as fully explained in a co-pending application Serial No. 259,982 filed February 20, 1963 and entitled "Ratio Control For Toroidal Drive" invented by Michael Davis et al. The pivot shaft control system itself forms no part of the present invention and reference may be made to said co-pending application for a more detailed explanation of said control system.

With reference to FIGS. 1 and 3, there are shown therein two hydraulic stop mechanisms, generally designated 78 and 80 positioned beneath and adjacent to a roller 20, there being two such stop mechanisms 78 and 80 positioned in the same manner adjacent each of the other rollers 20 provided in the transmission. As shown in FIG. 3, each hydraulic stop mechanism 78 and 80 comprises a stop member 82 supported on a shaft 84 which extends into a hydraulic cylinder 86. Supported on the end of shaft 84 within the cylinder 86 is a piston member 88 which closely engages the inner surface of the walls of said cylinder 86 so that a hydraulic fluid force may be applied to one face of said piston 88 for opposing inward movement of each stop member 82 and thereby maintaining the position of the stop member 82. Each stop mechanism 78 and 80 may be suitably supported in the transmission housing, as for example, by bolts 90 passing through suitable flanges 92 on the cylinders 86 and fastened to said housing.

As further illustrated in FIGS. 1 and 3, it can be seen that the stop mechanisms 78 and 80 are positioned so that the stop members 82 will limit the speed-ratio changing movement of the rollers substantially at their extreme speed-ratio position, which positions are illustrated by the rollers shown in dotted lines in FIG. 3. Therefore, the stop member 82 of stop mechanism 78 is positioned so that it will abut against one end of the end plate 54 when the roller 20 is pivoted toward its extreme overdrive position or in other words, the roller position of high output speed to input speed. Likewise, the stop member 82 of stop mechanism 80 is positioned so that it will abut an opposite end of end plate 54 when the roller 20 is pivoted toward its extreme underdrive or low output speed to input speed position. It may be said therefore, that each stop mechanism 78 is positioned at the overdrive side of its respective roller 20 and each stop mechanism 80 is positioned at the underdrive side of its respective roller 20. The surfaces of stops 82 which engage the end plate 54 are inclined, as illustrated, so that if the pistons 88 are slid back and forth within their respective cylinders thereby changing the position of stops 82, the speed-ratio position at which time the end plate 54 abuts a stop 82 will be changed. Thus, it can be seen that the limiting speed-ratio position of the rollers 20 may be changed by varying the position of pistons 88 and thereby varying the position of stops 82.

As stated above, the position of the stops 82 is maintained by a hydraulic force applied thereto. A hydraulic control mechanism 94 is provided for each set of stops 78 and 80 each of which comprises a cylinder member 96 with a piston 98 slidably engaging the inner surface of the walls of said cylinder. The piston 98 is fixed to a shaft 100 which is threaded and mates with corresponding threads in the cylinder 96 and suitable means, for example a slot 102 for a screwdriver, are provided at the opposite end of said shaft 100 so that the position of the piston 98 may be adjusted within its respective cylinder 96. Leading from the end of each said cylinder 96 opposite to the end wherein the threaded shaft 100 is located, are a plurality of hydraulic fluid pressure lines 104a, 104b, 104c connected to one cylinder 96 and 106a, 106b and 106c, connected to the other cylinder 96, there being one such line connected to each hydraulic stop mechanism. Each of the lines 104a, 104b and 104c are connected from its one cylinder 96 to a stop mechanism 78 and therefore, each of the stop mechanisms 78 may therefore be said to be hydraulically interconnected. The lines 106a, 106b and 106c likewise hydraulically interconnect each of the stop mechanisms 80 with its control cylinder 96. Each cylinder 96 and its respective lines 104a, 104b, 104c and 106a, 106b and 106c and cylinders 78 and 80 are substantially filled with a hydraulic fluid such that, from one face of piston 98 to a face on each piston 88 the hydraulic fluid is trapped therebetween. It will be apparent therefore, that when the shaft 100 of a piston 98 is rotated to vary the position of piston 98 within its respective cylinder 96, for example, further into the cylinder 96, the trapped hydraulic fluid will push against the pistons 88 of the associated stop mechanisms and cause the stop members 82 to move further outwardly with respect to its cylinder 78 or 80. If it is desired to further limit the extreme overdrive speed-ratio position, a piston 98 of one control member 94 associated with the stop mechanisms 78 on the overdrive side of the rollers may be turned so that it slides further into its cylinder 96 which will cause the fluid to push on all pistons 88 of stop mechanisms 78 and cause stops 82 to move further inward toward pivot shafts 50. Because of the inclination on the engagement surface of each stop member 82, the relative stop engaging position will be changed so that in pivoting toward its extreme overdrive position, the rollers 20 will be stopped at a relatively lower overdrive position than previous to said adjustment.

As the rollers 20 approach the stop members 82 at one speed-ratio limiting position, one roller may engage its associated stop member 82 before the other rollers. When this occurs, the roller will push the stop member 82 through its piston 88 against the fluid in its cylinder 86, and since the stop mechanisms are hydraulically interconnected by the fluid trapped in their respective lines to a control cylinder 94, the fluid will push outwardly against each of the pistons 88 of the other cylinders 86 until all of the stop members 82 are urged in an outward direction and are balanced at the same speed-ratio limiting position. Thus, an equal force is applied to each stop member 82 by the roller to equally position each of the stop members and each roller assembly will therefore be in the same position of speed-ratio without any slippage occurring between the rollers. The other control member 94 may be likewise adjusted for limiting the extreme underdrive position of the rollers 20. It will be apparent that the position of the piston members 98 may be adjusted to change the speed-ratio limiting positions of their respective stop members and that the stop members will be balanced at the same speed-ratio limiting positions by an equal force applied by the rollers, as explained above. The stop members 82 are normally positioned so that in any event, when the rollers are pivoting toward their extreme overdrive and underdrive limiting positions, the stop members 82 will prevent the rollers from running off the input or output disc surfaces 22 and 26.

FIG. 4 illustrates another embodiment of the invention. As shown therein, the stop mechanism 80' is positioned so that its stop member 82' and its shaft 84' extend in a direction perpendicular to the axis of the input shaft 12 and output shaft 14. The shaft 84' carries a piston member 88' for acting against a fluid contained in a cylinder 86' which is supplied from line 106a suitably connected to the master control cylinder 94, as in the case of the embodiment of FIGS. 1 and 3. The stop member 82' with its cylinder 86' is positioned so that, when the roller 20 pivots toward an extreme speed-ratio position, as for example, illustrated by phantom lines in FIG. 4, the end plate 54 of said roller will engage the stop member 82' and push against said stop member which through its piston 88' will act against the trapped fluid in the system to balance each of the stop mechanisms 80' for equally stopping the rollers at a limiting speed-ratio position. As is apparent from FIG. 4, the stop member 82', in this embodiment may take the form of a rounded portion on the end of its shaft 84'. It should be understood that a stop mechanism 80' is provided on one side of each roller 20 and a like stop mechanism is also provided on the other side of each roller 20 for limiting the speed-ratio movement of said rollers in the opposite direction. Each of the stop mechanisms of this embodiment are connected to a master control cylinder 94 in the same manner as illustrated in FIG. 3 and function in the same manner as that described in relation to the embodiments of FIGS. 1 and 3.

A cam and sprag device 110 may also be provided between the input shaft 12 and the relatively movable input disc 16, as illustrated in FIG. 1, and may be of the type clearly disclosed in United States Patent 3,048,047 issued on August 7, 1962. As disclosed therein, the cam and sprag device serves to transmit torque from the input shaft through said cam and sprag device to axially urge the input disc 16 and the output disc 18 toward each other and against rollers 20. The cam and sprag device 110 forms no part of the present invention and reference may be made to the above-mentioned patent for a more detailed description thereof.

While I have described my invention in detail in its present preferred embodiments, it will be obvious to those skilled in the art, after understanding my invention, that various changes and modifications may be made therein without departing from the spirit and scope thereof. For example, the position of the stop mechanisms 78 and 80 may be changed so that they occupy positions other than that shown in FIGS. 1, 3, and 4. Also, the end plates 54 may be modified with different stop engagement means other than that illustrated.

I claim as my invention:

1. A variable speed transmission having co-axial input and output members with facing toric surfaces and a plurality of circumferentially-spaced rollers disposed between and in driving contact with said surfaces for transmitting torque from the input member to the output member, support means for each roller providing for speed-ratio changing pivotal movement of said rollers across said toric surfaces and including means providing for independent second movement for initiating speed-ratio changing pivotal movement of said rollers, a plurality of stop means, one for each roller and engageable therewith for limiting speed-ratio changing pivotal movement of each roller beyond a predetermined position in one speed-ratio changing direction, each said stop means including a piston member, and passage means filled with fluid and interconnecting one side of each piston member to oppose inward movement of each stop means such that engagement of one roller with its associated stop means to inwardly move said stop means is effective through said fluid and pistons to urge each of the other stop means in an outward direction toward engagement with their respective rollers.

2. A variable speed transmission as recited in claim 1 wherein said rollers are supported for speed-ratio pivotal movement between a limiting underdrive speed-ratio position and a limiting overdrive speed-ratio position and stop means positioned adjacent said limiting underdrive speed-ratio position of each roller and stop means positioned adjacent said limiting overdrive speed-ratio position of each roller.

3. A variable speed transmission as recited in claim 2 further comprising control means interconnected with said passage means of each of said stop means for varying the fluid pressure in said passage means such that said stop means will be positioned for limiting the speed-ratio position of said rollers in accordance with the fluid pressure force applied to said stop means from said control means.

4. A variable speed transmission as recited in claim 3 wherein said control means comprises a hydraulic control cylinder hydraulically interconnected with each stop means positioned adjacent said limiting underdrive roller speed-ratio position and a hydraulic control cylinder hydraulically interconnected with each stop means positioned adjacent said limiting overdrive roller speed-ratio position.

5. A variable speed transmission as recited in claim 4 wherein each said hydraulic control cylinder includes an adjustable control piston, and means for adjusting the position of said piston within its associated hydraulic control cylinder such that when the position of said control piston is adjusted the speed-ratio limiting position of its associated stop means will be varied.

No references cited.